United States Patent [19]
Fessmann

[11] Patent Number: 5,171,022
[45] Date of Patent: Dec. 15, 1992

[54] SHAFT SEAL OF A MIXING AND KNEADING MACHINE

[75] Inventor: Walter Fessmann, Waiblingen, Fed. Rep. of Germany

[73] Assignee: Werner & Pfleiderer GmbH, Stuttgart, Fed. Rep. of Germany

[21] Appl. No.: 830,731

[22] Filed: Feb. 4, 1992

[30] Foreign Application Priority Data

Mar. 9, 1991 [DE] Fed. Rep. of Germany ....... 4107586

[51] Int. Cl.⁵ ............................................. F16J 15/18
[52] U.S. Cl. .................................... 277/3; 277/27; 277/60; 277/64; 277/77; 277/106
[58] Field of Search ............... 277/3, 27, 59, 60, 61, 277/62, 64, 69, 77, 102, 104, 106, 117, 118, 123, 125

[56] References Cited

U.S. PATENT DOCUMENTS

| | | | |
|---|---|---|---|
| 675,019 | 5/1901 | Saxton | 277/64 X |
| 793,461 | 6/1905 | Mossman | 277/64 X |
| 1,989,349 | 1/1935 | Coberly | 277/3 X |
| 2,210,826 | 8/1940 | Williams | 277/77 |
| 2,296,542 | 9/1942 | Steen | 277/3 X |
| 2,345,019 | 3/1944 | Van Alstyne | 277/3 X |
| 2,539,932 | 1/1951 | Schmitz, Jr. | 277/115 X |
| 2,567,479 | 9/1951 | Hebard | 277/3 |
| 2,660,459 | 11/1953 | Collins | 277/77 X |
| 4,515,512 | 5/1985 | Hertell et al. | 277/59 X |
| 4,737,087 | 4/1988 | Hertell | 277/59 X |

FOREIGN PATENT DOCUMENTS

| | | | |
|---|---|---|---|
| 259319 | 3/1912 | Fed. Rep. of Germany | 277/59 |
| 2535812 | 5/1984 | France | 277/3 |
| 857601 | 8/1981 | U.S.S.R. | 277/3 |
| 203145 | 9/1923 | United Kingdom | 277/77 |

Primary Examiner—William A. Cuchlinski, Jr.
Assistant Examiner—Scott W. Cummings
Attorney, Agent, or Firm—Ladas & Parry

[57] ABSTRACT

A sealing arrangement is provided between the shaft of a mixing tool and the wall of a housing of a mixing and kneading machine, the sealing arrangement having a housing liner and a gland member which can be axially displaced against a support ring arranged between the shaft and the housing liner. The liner is formed by an outer sleeve sealingly placed in the wall of the housing and an inner sleeve resiliently abutted against the outer sleeve to define an annular space therebetween which is sealed by elastic seals which are pressurized by a pressure medium. A sealing arrangement of juxtaposed elastic gaskets is arranged in an annular space between the inner sleeve and the shaft and the gaskets are axially compressed between the gland member and an inward projection at the end of the inner sleeve.

16 Claims, 2 Drawing Sheets

SHAFT SEAL OF A MIXING AND KNEADING MACHINE

FIELD OF THE INVENTION

The invention relates to a sealing arrangement between the wall of a housing of a mixing and kneading machine and the shaft of a rotating tool in the housing, wherein the sealing arrangement is axially displaceable and prestressed into sealing contact with a liner in the housing wall and a support surface of the shaft.

BACKGROUND AND DESCRIPTION OF PRIOR ART

DE-OS 20 00 326 discloses a dust collector for a Banbury mixer in which the shafts of mixing rotors of a mixing device are sealed at their ends by sealing arrangements. In the sealing arrangement, the opening for the shaft is sealed by an annular end plate rigidly secured to the mixer housing and by a packing ring which is compressed against a shaft connector by means of a pressure spring. A sealing contact which is effective over the entire shaft is obtained by controlling the sealing pressure.

SUMMARY OF THE INVENTION

An object of the invention is to provide a sealing arrangement, which acts during the mixing operation to produce an effective sealing function, free of dead space, and uniform all around the shaft being sealed.

The above and further objects are satisfied by a sealing arrangement according to the invention which comprises:

inner and outer concentric sleeves disposed in the bore in a housing between the shaft of a mixing tool and the housing, said inner and outer sleeves defining an annular space therebetween;

means supporting said sleeves from said housing for relative axial movement between the sleeves;

elastic means sealing said annular space;

means for introducing a pressure medium into said annular space to pressurize said elastic means and provide an elastic sealing of said annular space which permits relative axial movement of said sleeves; and further elastic means between said inner sleeve and said shaft for sealing said inner sleeve and said shaft, said inner sleeve including an annular head, said further elastic means comprising a gland member facing said annular head in axially spaced relation and a plurality of elastic gaskets clamped between said annular head and said sealing ring to provide a sealed relationship between said inner sleeve and said shaft.

An elastic tension state is produced which acts both in a radial and axial direction relative to the shaft and the housing by the combined arrangement of the relatively displaceable sleeves and the elastic means which is pressurized.

Any radial movement of the shaft produced during the mixing process in the region where the shaft passes through the housing bore is accommodated by providing a constantly present play between the sleeves whereby elastic deformation of the mixing and kneading tool is taken up.

The remaining minimum sealing gaps assure a sufficient freedom from dead space, so that the sealing function of individual packing elements is not hindered by the mass of the mixed materials in the housing or even if the mass begins to harden.

In one embodiment of the invention, the elastic means comprises two axially spaced prestressing rings forming respective chambers with the sleeves into which elastic sealing rings are disposed under pressure to be in sealed contact with the inner sleeve. This makes possible an effective sealing of the annular space under elastic prestress even with a high deflection of the inner sleeve.

A sufficient prestress of the elastic sealing rings is assured in the case of higher manufacturing tolerances by placing a compression spring between the sealing rings.

In a further embodiment of the invention, the elastic means comprises first and second coaxially arranged rings which are relatively axially displaceable and define two chambers in which sealing rings are placed. This construction permits a rapid replacement of the coaxially arranged rings and the sealing rings by a simple and cost-favorable configuration of the coaxial rings. In this way, both an axial elastic prestress as well as a radial elastic prestress ar obtained by the sealing rings by pressurizing the elastic means with the pressure medium.

In a embodiment for the introduction of the pressure medium uniformly all around for stressing the sealing rings, the outer ring is provided with an axial channel communicating with a channel in the outer sleeve.

A multi-axial stress state is formed between the shaft and the inner sleeve by an embodiment of the invention in which the elastic gaskets are formed as juxtaposed gaskets of trapezoidal cross-section which are axially spaced from further juxtaposed gaskets through the intermediary of a metal bearing ring. Consequently, only minimal sealing gaps remain.

The liquid and subsequently hardening masses which are mixed and kneaded in the housing are prevented from escaping into the sealing region by the effective introduction of a lubricant and sealing agent through a bore in the metal bearing ring.

According to a feature of the invention, the inner and outer sleeves have respective ends with inclined surfaces facing the interior of the housing for removal of the mixed material present between the mixing tools and the walls of the housing.

DETAILED DESCRIPTION OF PREFERRED EMBODIMENTS

Figure 1:
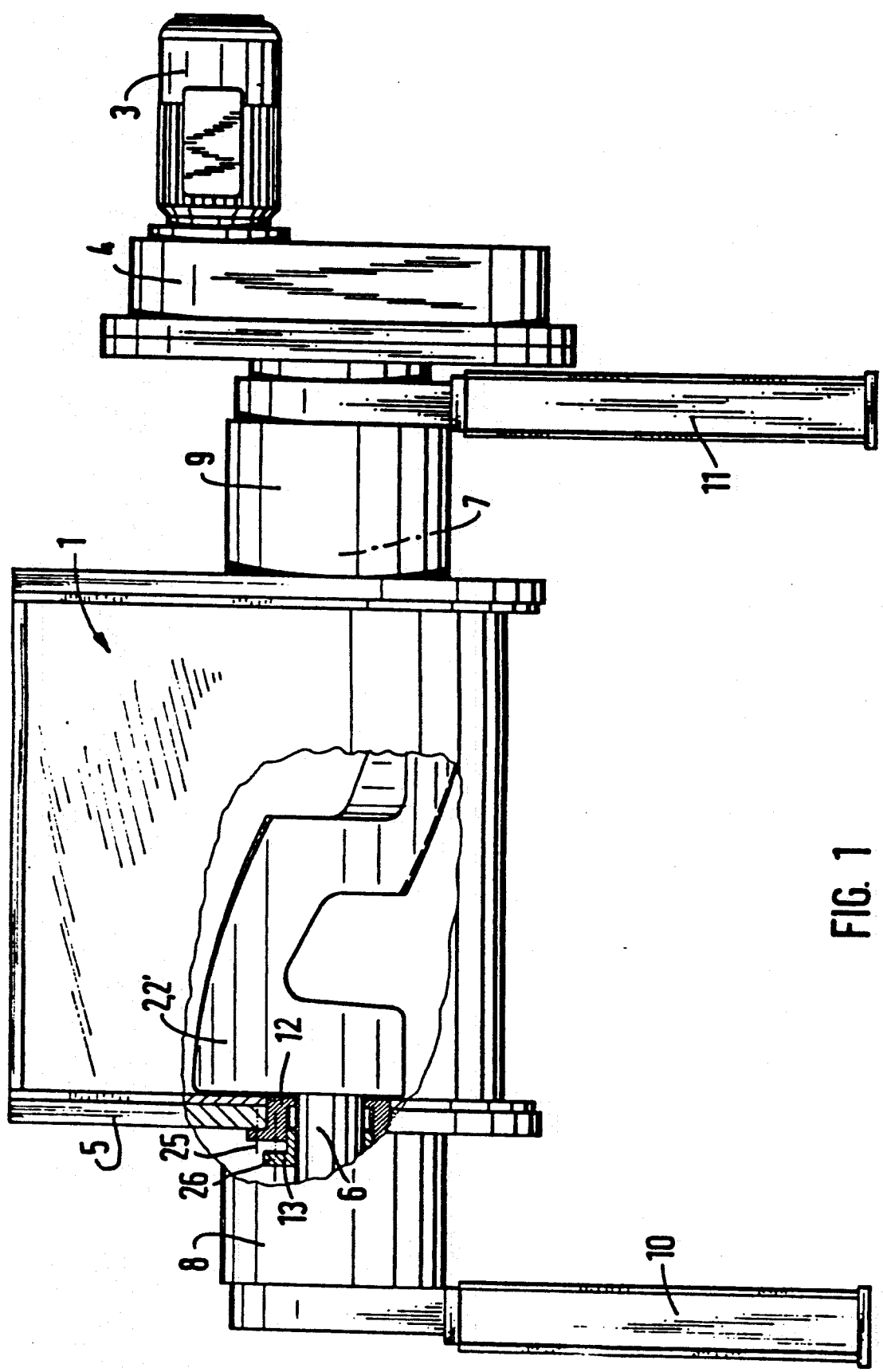
FIG. 1 is an elevational view, partly broken away, and in section of a mixing and kneading machine.

In FIG. 1, there is shown a mixing and kneading machine which comprises a mixing and kneading housing 1 containing mixing tools 2, 2', which are driven in rotation by means of a drive motor 3 and a transmission 4 in the mixing and kneading housing 1. The two mixing tools 2, 2' (which are not shown in great detail) have shafts or journals 6, 7 which pass through side walls 5 of the mixing and kneading housing 1. The journals are supported in corresponding bearing housings 8 and 9.

The journal 7 is not shown as it is a mirror-image construction of journal 6.

The mixing and kneading machine is secured in an elevated manner above a support surface by means of supports 10, 11 arranged under both bearing housings 8, 9.

Journals 6, 7 are sealed to the outside in the region of their passage through housing wall 5 by means of a housing liner 12 and a gland member 13. The housing liner 12 is secured to housing wall 5 by a bolt connection 25, whereas gland member 13 is secured by a bolt connection 26 to housing liner 12.

Figure 2:
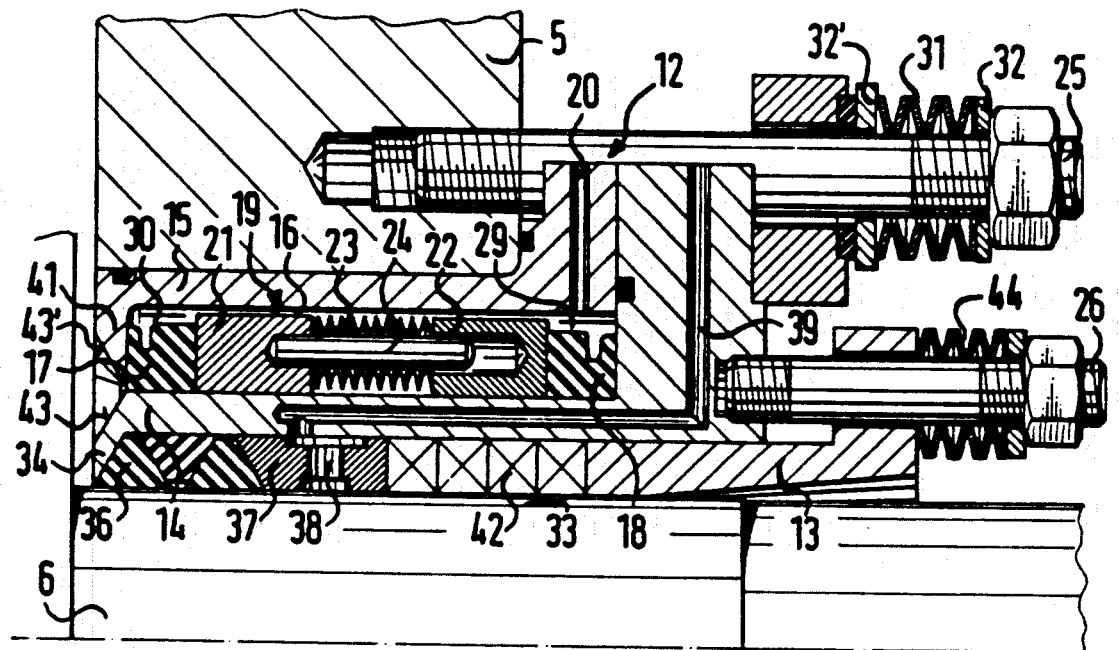
FIG. 2 shows, on enlarged scale and in section, one embodiment of a sealing arrangement according to the invention.

As shown in more detail in FIG. 2, housing liner 12 consists of an inner sleeve 14 and an outer sleeve 15, which sleeves are arranged concentrically and define an annular space 16 therebetween. The annular space 16 is bounded at its ends by inner sleeve 14 and outer sleeve 15. Grooved rings 17, 18 are disposed in space 16 to seal the space 16. The rings 17, 18 are each provided with an annular groove so that the rings are elastic axially and the rings are made of modified polytetrafluoroethylene. A single acting compression of the rings 17, 18 can be obtained by interposing a sealing arrangement 19, serving as a spacer, between grooved rings 17, 18. By applying pressure in annular space 16 by introducing a pressure medium therein through a channel 20 in sleeve 15, sealing of space 16 is produced by engagement of grooved rings 17 and 18 against inner sleeve 14 and outer sleeve 15.

The elastic pressurization of the grooved rings 17, 18 obtained by the pressure medium, is preferably achieved by utilizing, as the sealing arrangement 19, axially spaced prestressing rings 21, 22. Thereby, the grooved rings 17, 18 are axially prestressed by means of the pressure medium, or additionally by means of an elastic force. Additional prestress is obtained by the arrangement of several pressure springs 23 between rings 21, 22. The rings 21, 22 are secured against relative turning by straight pin 24 slidably engaged in bores in the prestressing rings 21, 22.

Figure 3:
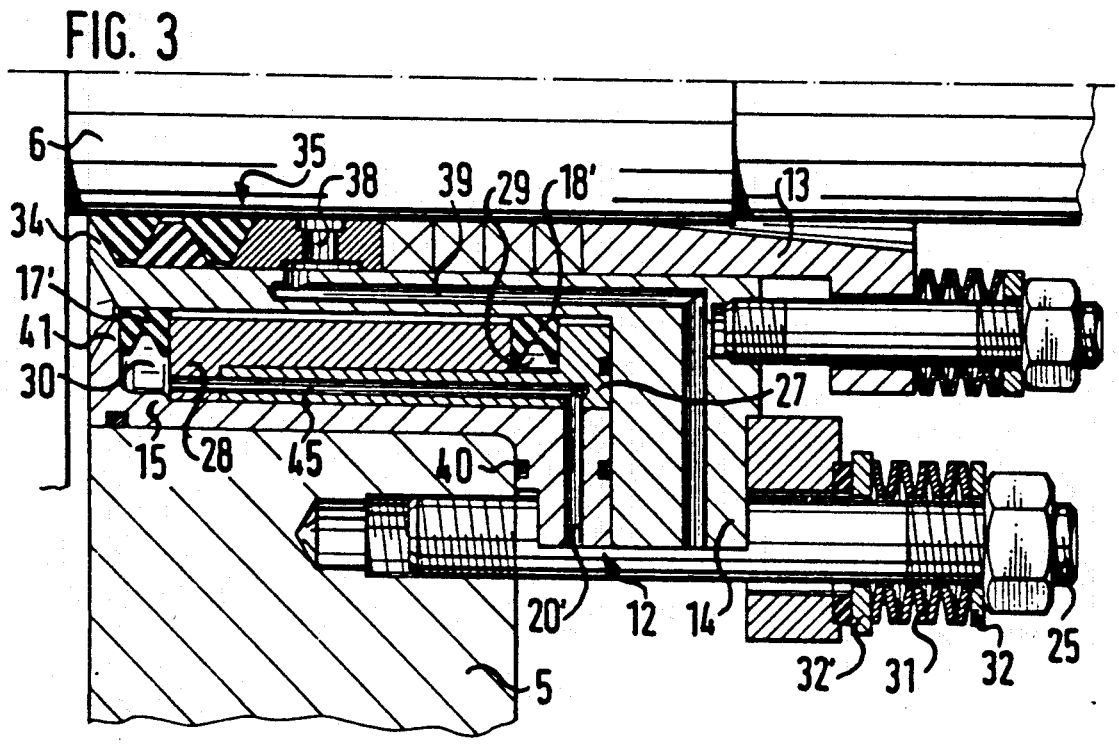
FIG. 3 is similar to FIG. 2 and shows another embodiment of the sealing arrangement.

FIG. 3 shows another embodiment of the sealing arrangement 19 which comprises coaxially arranged rings 27, 28 which have heads at respective opposite ends. The rings 27, 28 can be displaced axially relative to one another. Annular chambers 29, 30 are defined by rings 27, 28 and sleeve 15 and grooved rings 17', 18' are disposed in chambers 30, 29, respectively. More particularly, annular chamber 29 receiving grooved ring 18' is defined at its sides by the annular head of outer ring 27 and the facing end of inner ring 28. The second annular chamber 30 receiving grooved ring 17' is bounded at its sides by the head of ring 28 and by a radial projection 41 extending inwardly on sleeve 15.

The sealing arrangement 19 is an elastic means which provides radial play within the annular space 16 so that radial movements of journal 6 and thereby of mixing tools 2, 2' can be readily accommodated.

O-rings 40 are placed between sleeves 14 and 15 and wall 5 to seal the opposed surfaces.

The sealing arrangement in FIG. 3 is pressurized by a pressure medium which is supplied through a radial bore 20' in outer sleeve 15 which communicates with a longitudinal channel 45 in inner sleeve 14. The channel 45 communicates with chamber 30 to pressurize chamber 30 and compress grooved ring 18' to provide elastic prestress of the grooved rings 17', 18' and press the rings against the inner sleeve 14.

Inner sleeve 14 is connected to housing wall 5 by bolt connection 25 which includes springs 31 so that the bolt connection 25 can be put under axial prestress whereby axial displacement of journal 6 is elastically resisted. The springs 31 are clamped between support rings 32 and 32' in bolt connection 25.

A sealing assembly 35 is interposed between the inner sleeve 14 and journal 6 in both embodiments of FIGS. 2 and 3 to seal the journal and since the assemblies 35 are the same, it will be described hereafter only with reference to FIG. 2.

In the region of the sealing assembly 35, the journal 6 has a coating 33 with a finely ground bearing surface. An annular space is formed between inner sleeve 14 and journal 6 which is bounded longitudinally and axially by an inner radial projection forming a support 34 on inner sleeve 14 and by a gland member 13. In this annular space, a plurality of gaskets 36 which are trapezoidal in cross-section are juxtaposed with one another. The gaskets 36 are engaged against support 34 on inner sleeve 14 at one end and against a metal bearing ring 37 at the other end. Gaskets 36 consist of modified polytetrafluoroethylene. They are flexible in shape and arrangement and reduce the gap at the seal surfaces to a minimum.

Bearing ring 37 serves as a support for inner sleeve 14 to transmit radial deflections of journal 6 thereto. The bearing ring 37 has a bore 38 for conveying a lubricating and sealing agent to the journal 6 from a feed channel 39 in inner sleeve 14. Conventional seals 40 are provided to seal the sealing arrangement from the outside atmosphere. The seals 40 are placed between outer sleeve 15 and the housing 5 and between the inner and outer sleeves 14 and 15. Additionally, in the embodiment of FIG. 3, a seal 40 is placed between the inner sleeve 14 and the ring 27. The seals 40 can be prestressed elastically in the axial direction together with gaskets 36 by the gland member 13. For this purpose, gland member 13 is loaded by the force of springs 44 in bolt connection 26, so that the entire sealing assembly 35 is thereby prestressed elastically. Between bearing ring 37 and gland member 13 are a plurality of juxtaposed rectangular ring gaskets 42.

An elastic and thus self-acting equilibrating sealing action is obtained radially and axially of journal 6 by the elastic properties of sealing assembly 35.

The surface 43 of inner sleeve 14 which faces into the housing is inclined in the region of support 3 and the surface 43° of outer sleeve 15 which faces into the housing 1 is also inclined to promote displacement of product back into the interior of housing 1.

The sealing assembly 35, in combination with the flexible arrangement of grooved rings 17, 18 in annular space 16, forms a sealing arrangement that can also accommodate and resist large deflections of the corresponding journal 6. The combination is characterized by a high sealing effect and a long service life.

While the invention has been described with reference to particular embodiments thereof, it will become apparent to those skilled in the art that numerous modifications and variations can be made within the scope and spirit of the invention as defined in the attached claims.

What is claimed is:

1. A sealing arrangement in the bore of a housing of a mixing and kneading machine for sealing a shaft of a mixing tool in the housing, said arrangement comprising:

inner and outer concentric sleeves disposed in the housing between the shaft of the mixing tool and the housing, said inner and outer sleeves defining an annular space therebetween;

means supporting said sleeves from said housing for relative axial movement between the sleeves;

elastic means sealing said annular space;

means for introducing a pressure medium into said annular space to pressurize said elastic means and provide an elastic sealing of said annular space which permits relative axial movement of said sleeves, and further elastic means between said inner sleeve and said shaft for sealing said inner sleeve and said shaft, said inner sleeve including an annular head, said further elastic means comprising a gland member facing said annular head in axially spaced relation and a plurality of elastic gaskets clamped between said annular head and said gland member to provide a seal between said inner sleeve and said shaft.

2. A sealing arrangement as claimed in claim 1, wherein said elastic means comprises two axially spaced prestressing rings disposed in said annular space, said prestressing forming respective chambers with said inner and outer sleeves, and elastic sealing rings in said chambers in sealed contact with said inner sleeve, said means for introducing a pressure medium comprising a pressure connection for supply of said pressure medium between said prestressing rings to compress said elastic sealing rings in said chambers.

3. A sealing arrangement as claimed in claim 2, wherein said elastic sealing rings each has an annular groove therein.

4. A sealing arrangement as claimed in claim 2, wherein said pressure connection includes a channel in said outer sleeve extending into said annular space.

5. A sealing arrangement as claimed in claim 2, comprising spring means between said prestressing rings for urging said rings axially apart to compress said elastic sealing rings in said chambers.

6. A sealing arrangement as claimed in claim 5, comprising pins slidably engaging said prestressing rings to prevent relative turning therebetween.

7. A sealing arrangement as claimed in claim 1, wherein said elastic means comprises first and second coaxially arranged rings which are axially displaceable relative to one another.

8. A sealing arrangement as claimed in claim 7, wherein one of said coaxially arranged rings defines a first chamber with one of said sleeves and a second chamber with the other of said rings, said elastic means further comprising elastic sealing rings in said chambers in sealing contact with said inner sleeve.

9. A sealing arrangement as claimed in claim 8, wherein said means for introducing a pressure medium comprises a channel in said first ring communicating with one of said chambers.

10. A sealing arrangement as claimed in claim 9, wherein said first ring is an outer ring and said second ring is an inner ring, each of said rings including an annular radially projecting head which bounds a respective one of said chambers.

11. A sealing arrangement as claimed in claim 10, wherein said outer sleeve includes an annular projection extending radially of said sleeve facing the radially projecting head of the second ring to form said first chamber.

12. A sealing arrangement as claimed in claim 1, wherein said elastic gaskets include juxtaposed gaskets which are trapezoidal in cross-section.

13. A sealing arrangement as claimed in claim 12, wherein said further elastic means comprises further gaskets which are juxtaposed and axially spaced from the trapezoidal gaskets and a bearing ring of rigid material interposed between said trapezoidal gaskets and said further gaskets.

14. A sealing arrangement as claimed in claim 13, wherein said bearing ring has a radial bore facing said shaft, said inner sleeve having a feed bore which communicates with said radial bore in the bearing ring to supply a lubricating and sealing agent to said shaft via said radial bore.

15. A sealing arrangement as claimed in claim 1, wherein said inner and outer sleeves have respective ends with inclined surfaces facing into said housing.

16. A sealing arrangement as claimed in claim 1, wherein said means elastically supporting the sleeves from the housing comprises a first bolt connection including a spring between said housing and one of said sleeves, and a second bolt connection including a spring between said one of said sleeves and said sealing ring.

* * * * *